US010851632B2

(12) United States Patent
Brown et al.

(10) Patent No.: US 10,851,632 B2
(45) Date of Patent: Dec. 1, 2020

(54) HEAT SCAVENGING METHOD FOR THERMAL RECOVERY PROCESS (71) Applicant: CONOCOPHILLIPS COMPANY, Houston, TX (US)

(72) Inventors: David A. Brown, Katy, TX (US); Siluni L. Wickramdthilaka, Katy, TX (US); Logan A. Warren, Houston, TX (US); Thomas J. Wheeler, Houston, TX (US); Pradeep A. Govind, Calgary (CA)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 14/150,419

(22) Filed: Jan. 8, 2014

(65) Prior Publication Data
US 2014/0216739 A1 Aug. 7, 2014

Related U.S. Application Data (60) Provisional application No. 61/750,248, filed on Jan. 8, 2013.

(51) Int. Cl.
E21B 43/24 (2006.01)
E21B 43/16 (2006.01)
C09K 8/592 (2006.01)
C09K 8/94 (2006.01)

(52) U.S. Cl.
CPC .......... *E21B 43/2408* (2013.01); *C09K 8/592* (2013.01); *C09K 8/94* (2013.01); *E21B 43/16* (2013.01)

(58) Field of Classification Search
CPC ........................................ C09K 8/94
See application file for complete search history.

(56) References Cited

U.S. PATENT DOCUMENTS

| 3,565,175 A * | 2/1971 | Wilson ................... 166/269 |
| 3,993,133 A | 11/1976 | Clampitt |
| 3,994,345 A | 11/1976 | Needham |
| 4,086,964 A | 5/1978 | Dilgren et al. |
| 4,161,217 A | 7/1979 | Dilgren et al. |
| 4,488,598 A * | 12/1984 | Duerksen ................ 166/252.4 |
| 4,488,976 A | 12/1984 | Dilgren et al. |
| 4,532,993 A | 8/1985 | Dilgren et al. |
| 4,601,336 A | 7/1986 | Dilgren |
| 4,607,700 A | 8/1986 | Duerksen et al. |
| 4,609,044 A | 9/1986 | Lau |
| 4,643,256 A | 2/1987 | Dilgren et al. |
| 4,693,311 A | 9/1987 | Keijzer et al. |
| 4,702,317 A | 10/1987 | Shen |
| 4,727,938 A | 3/1988 | Lau |
| 4,852,653 A | 8/1989 | Borchardt |
| 4,911,241 A * | 3/1990 | Williamson ........... C09K 8/703 166/308.6 |
| 5,031,698 A | 7/1991 | Borchardt |
| 5,052,487 A | 10/1991 | Wall |
| 5,129,457 A * | 7/1992 | Sydansk ................ 166/402 |
| 5,172,763 A | 12/1992 | Frieman et al. |
| 5,193,618 A | 3/1993 | Frazier et al. |
| 5,207,271 A | 5/1993 | Alameddine et al. |
| 7,882,893 B2 * | 2/2011 | Fraim ..................... 166/260 |
| 2001/0020675 A1 * | 9/2001 | Tubel et al. ............ 250/227.11 |
| 2009/0194278 A1 * | 8/2009 | De Francesco ........... 166/261 |
| 2010/0258265 A1 | 10/2010 | Karanikas et al. |
| 2012/0220502 A1 * | 8/2012 | Jurgenson et al. ........ 507/135 |
| 2013/0000898 A1 | 1/2013 | Boone |
| 2013/0341023 A1 * | 12/2013 | Krumrine, III ........ C09K 8/64 166/280.1 |

OTHER PUBLICATIONS

Cole et al., "The Viscosity of Nitrogen, Oxygen, and Their Binary Mixtures in the Limit of Zero Density," Journal of Physical and Chemical Reference Data, vol. 14, No. 1, 1985, pp. 209-226.*
Al-Khafaji, Ali Habib, Wang, Pin-Ton Fred, Castanier, Louis M. and Brigham, William E., "Steam Surfactant Systems at Reservoir Conditions", paper SPE 10777 presented at the California Regional Meeting of the Society of Petroleum Engineers, San Francisco, CA, Mar. 24-26, 1982.
Bagci, S., Dogay, S., Pamukcu, Y. and Yilmaz, Y., "Investigation of Surfactant-SAGD Process in Fractured Carbonate Reservoirs", paper 2004-087 presented at the Petroleum Society's 5th Canadian International Petroleum Conference (55th Annual Technical Meeting), Calgary, Alberta, Canada, Jun. 8-10, 2004.
Chen, Q., Gerritsen, M.G. and Kovscek, A.R., "Improving Steam-Assisted Gravity Drainage Using Mobility Control Foams: Foam Assisted-SAGD (FA-SAGD)", paper SPE 129847 presented at the SPE Improved Oil Recovery Symposium, Tulsa, OK USA, Apr. 24-28, 2010.
Chiang, Jin C., Sawyal, Subir K., Castanier, Louis M., Brigham, William E. and Sufi, Arshad, "Foam as a Mobility Control Agent in Steam Injection Processes", paper SPE 8912 presented at the 50th Annual California Regional Meeting of the Society of Petroleum Engineers of AIME, Los Angeles, California, Apr. 9-11, 1980.
Cooke, R.W. and Eson, R.L., "Field Results of Optimizing the Steam Foam Diversion Process in Cyclic Steam Applications", paper SPE 21531 presented at the International Thermal Operations Symposium, Bakersfield, CA, Feb. 7-8, 1991.
Delamaide, E. and Kalaydjian, F., "A Technical and Economical Evaluation of Steam Foam Injection Based on a Critical Analysis of Field Applications", paper SPE 35692 presented at the Western Regional Meeting, Anchorage, Alaska, May 22-24, 1996.
Demiral, M.R.B. and Okandan, E., "Experimental Analysis of Steam Foam Injection to Heavy Oil Limestone Reservoirs", paper SPE 15734 presented at the 5th SPE Middle East Oil Show, Manama, Bahrain, Mar. 7-10, 1987.

(Continued)

*Primary Examiner* — Andrew Sue-Ako
(74) *Attorney, Agent, or Firm* — Boulware & Valoir (57) ABSTRACT Thermal recovery of oils is improved by capturing waste heat from a depleted steam chamber using steam plus foam and an optional gas to carry low quality steam deep into the chamber where the waste heat converts water to steam in situ. Thus, overall steam generation needs and thus costs are reduced.

8 Claims, 3 Drawing Sheets

(56) References Cited

OTHER PUBLICATIONS

Dilgren, Richard E., Deemer, Arthur R. and Owens, Kenneth B., "The Laboratory Development and Field Testing of Steam/Noncondensible Gas Foams for Mobility Control in Heavy Oil Recovery", paper SPE 10774 presented at the California Regional Meeting of the Society of Petroleum Engineers, San Francisco, CA, Mar. 24-26, 1982.
Djabbarah, N.F., Weber, S.L., Freeman, D.C., Muscatello, J.A., Ashbaugh, J.P. and Covington, T.E., "Laboratory Design and Field Demonstration of Steam Diversion with Foam", paper SPE 20067 presented at the 60th California Regional Meeting, Ventura, CA Apr. 4-6, 1990.
Eson, R.L. and O'Nesky, S.K., "The Application of In-Situ Steam Foams to Improve Recovery in Mature Steam Drives", paper SPE 11704 presented at the California Regional Meeting of the Society of Petroleum Engineers, Ventura, CA, Mar. 23-25, 1983.
Eson, R.L. and Cooke, R.W., "A Successful High-Temperature Gel System to Reduce Steam Channeling", paper SPE 24665 presented at the 67th Annual Technical Conference and Exhibition of the Society of Petroleum Engineers, Washington, DC, Oct. 4-7, 1992.
Falls, Andrew H., Lawson, Jimmie B. and Hirasaki, George J., "The Role of Noncondensable Gas in Steam Foams", Journal of Petroleum Technology, Jan. 1988.
French, T.R., Broz, J.S., Lorenz, P.B. and Bertus, K.M., "Use of Emulsions for Mobility Control During Steamflooding", paper SPE 15052 presented at the 56th California Regional Meeting of the Society of Petroleum Engineers, Oakland, CA, Apr. 2-4, 1986.
Green, Kirk, Isaacs, Eddy and Chhom, Kiry Non, "Laboratory Study of the Use of Foam in Cyclic Steam Injection", The Journal of Canadian Petroleum Technology, 1991.
Isaacs, E. Eddy, McCarthy, F. Clare and Maunder, J. Darol, "Investigation of Foam Stability in Porous Media at Elevated Temperatures", SPE Reservoir Engineering, May 1988.
Isaacs, E.E., Green, M.K., Jossy, W.E. and Maunder, J.D., "Conformance Improvement by Using High Temperature Foams and Gels", paper SPE 23754 presented at the 2nd Latin American Petroleum Engineering Conference of the Society of Petroleum Engineers, Caracas, Venezuela, Mar. 8-11, 1992.
Julio, S.S. DI and Emanuel, A.S., "Laboratory Study of Foaming Surfactant for CO2 Mobility Control", SPE Reservoir Engineering, May 1989.
Juprasert, Max S. and Davis, Bruce W., "Stimulation by Defoaming Increases Thermal Oil Production", paper SPE 35695 presented at the Western Regional Meeting, Anchorage, Alaska, May 22-24, 1996.
Kulakofsky, D., Armstrong, K., Szymanski, M. and Raabe, G., "New Ultra-Lightweight Ultra-High Temperature Slurry Design Provided the Required Resilience for Steam Injection Work in Kuwait", paper SPE 97682 presented at the SPE International Improved Oil Recovery Conference in Asia Pacific, Kuala Lumpur, Malaysia, Dec. 5-6, 2005.

Law, D.H.S. and Ridley, R., "Simulation of a Three-Dimensional Steam Drive with Surfactant and Nitrogen", paper No. CIM 92-58 presented at the CIM Annual Technical Conference, Calgary, Jun. 7-10, 1992.
Law, David H.S., "An Optimization Study for a Steam-Foam Drive Process in the Bodo Reservoir, Alberta", The Journal of Canadian Petroleum Technology, 1992.
Law, D.H.S., Ridley, R. and Kimber, K.D., "Steam-Foam Drive Experiments in One-Eighth of a Five-Spot Pattern", paper No. 2 presented at the 5th Petroleum Conference of the South Saskatchewan Section, The Petroleum Society of CIM, Regina, Canada, Oct. 18-20, 1993.
Maini, B.B., "Laboratory Evaluation of Foaming Agents for High Temperature Applications—II. Measurements of Thermal Stability and Foam Mobility in Porous Media", paper 85-36-30 presented at the 36th Annual Technical Meeting of the Petroleum Society of CIM, Edmonton, Alberta, Canada, Jun. 2-5, 1985.
Maini, Brij B. and Ma, Vincent, "Laboratory Evaluation of Foaming Agents for High-Temperature Applications—I. Measurements of Foam Stability at Elevated Temperatures and Pressures", Well Completions and Operations, Journal of Canadian Petroleum Technology, 1986.
Mendez, Zuleyka, Alvarez, J.M., Escobar, Elena, Colonomos, Peter and Campos, Enrique, "Cyclic Steam Injection with Additives: Laboratory and Field Test Results of Steam/Foam and Steam/Solvent Processes", paper SPE 24632 presented at the 67th Annual Technical Conference and Exhibition of the Society of Petroleum Engineers, Washington, DC, Oct. 4-7, 1992.
Mohammadi, S.S., Van Slyke, D.C. and Ganong, B.L., "Steam-Foam Pilot Project in Dome-Tumbador, Midway-Sunset Field", SPE Reservoir Engineering, Feb. 1989.
Muijs, H.M., Keijzer, P.P.M. and Wiersma, R.J., "Surfactants for Mobility Control in High-Temperature Steam-Foam Applications", paper SPE/DOE 17361 presented at the SPE/DOE Enhanced Oil Recovery Symposium,Tulsa, OK, Apr. 17-20, 1988.
Patzek, Tad W., "Field Applications of Steam Foam for Mobility Improvement and Profile Control", SPE Reservoir Engineering, May 1996.
Ploeg, J.F. and Duerksen, J.H., "Two Successful Steam/Foam Field Tests, Sections 15A and 26C, Midway-Sunset Field", paper SPE 13609 presented at the California Regional Meeting of the Society of Petroleum Engineers, Bakersfield, CA, Mar. 27-29, 1985.
Robaina, R.M., Maraven, S.A. and Ziritt, J.L., "Evaluation of a Surfactant: Steam-Soak Pilot Test in the Bolivar Coast, Venezuela", paper SPE/DOE 17386 presented at the SPE/DOE Enhanced Oil Recovery Symposium, Tulsa, OK, Apr. 17-20, 1988.
Ziegler, V.M., "Laboratory Investigation of High-Temperature Surfactant Flooding", SPE Reservoir Engineering, May 1988.
International Search Report. (PCT Article 18 and Rules 43 and 44). PCT/US2014/010731, dated Apr. 17, 2014.

* cited by examiner

HEAT SCAVENGING METHOD FOR THERMAL RECOVERY PROCESS

CROSS-REFERENCE TO RELATED APPLICATIONS

This application is a non-provisional application which claims benefit under 35 USC § 119(e) to U.S. Provisional Application Ser. No. 61/750,248 filed Jan. 8, 2013, entitled "HEAT SCAVENGING METHOD FOR THERMAL RECOVERY PROCESSES," which is incorporated herein in its entirety.

FEDERALLY SPONSORED RESEARCH STATEMENT

Not applicable.

FIELD OF THE INVENTION

The invention relates to a method of enhancing steam production of heavy oil, in particular to a method of improving recoveries and improving thermal efficiency by reducing steam and energy usage through the sweeping of the steam chamber with a low quality steam or hot water and foam combination. The low quality steam or hot water and foam combination carries water to the rock, that has been heated by the steam, and thus recaptures the waste heat therein and forms steam in situ, and driving production beyond what would normally be economical. Since less steam is used, the process is more cost effective than the conventional steam based methods alone.

BACKGROUND OF THE INVENTION

A common way of categorizing petroleum deposits is by density. Light oil—also known as "conventional oil"—has an API gravity of at least 22° and a viscosity less than 100 centipoise (cP). Heavy oil, by contrast, is an asphaltic, dense (low API gravity), and viscous hydrocarbon that is chemically characterized by its content of asphaltenes. Although definitions vary, the upper limit for heavy oils is usually set at 22° API gravity and a viscosity of more than 100 cP.

Typical characteristics of the various oils are shown in Table 1.

TABLE 1

| Range of Properties of Various Types of Petroleum | | | | |
|---|---|---|---|---|
| | Extra-light Crude Oil | Light Crude Oil | Heavy Crude Oil | Extra-Heavy Crude Oil |
| API gravity | >50 | 22-32 | 10-22 | <10 |
| Hydrocarbons (wt %) | | | | |
| Asphaltenes | 0-<2 | <0.1-12 | 11-25 | 15-40 |
| Resins | 0.05-3 | 3-22 | 14-39 | |
| Oils | — | 67-97 | 24-64 | |
| Impurities (Wt %) | | | | |
| Total sulfur | 0.02-0.2 | 0.05-4.0 | 0.1-5.0 | 0.8-6.0 |
| Total nitrogen | 0.0-0.01 | 0.02-0.5 | 0.2-0.8 | 0.1-1.3 |
| Ni + V (wpmm) | <10 | 10-200 | 50-500 | 200-600 |

The heavier crudes present a dilemma for the economics of petroleum development. The reserves of heavy oil in the world are more than twice those of conventional light crude oil. It has been reported that there may be as much as six trillion barrels of heavy oil and bitumen in place throughout the world, much of it located in Canada and Venezuela. However, the oil recovery factors for heavy oil are often limited to about 5-30% of the original oil in place, and the recovery costs are very high due to the extreme viscosity of the oil and its chemical makeup. Since the sources of light oil are being rapidly diminished, developers are continually searching for ways of producing heavy oil as cost effectively as possible to meet the ever-increasing demand.

Usually heavy oil is produced by reducing the viscosity of the oil enough to make it flow. Viscosity reduction can be achieved by applying heat, often in the form of steam, and/or adding solvents to partially dilute the oil. Table 2 lists a variety of enhanced oil recovery (EOR) techniques being used or in development for use in recovering heavy oils. While the technology utilized for the recovery of heavy oil has steadily increased recovery rates, there is still considerable room for improvement in this continually developing area.

TABLE 2

| | Enhanced Oil Recovery (EOR) Techniques |
|---|---|
| CSS | Cyclic Steam Stimulation or "huff and puff." Steam is injected into a well at a temperature of 300-340° C. for a period of weeks to months. The well is allowed to sit for days to weeks to allow heat to soak into the formation, and, later, the hot oil is pumped out of the well for weeks or months. Once the production rate falls off, the well is put through another cycle of steam injection, soak and production. This process is repeated until the cost of injecting steam becomes higher than the money made from producing oil. Recovery factors are around 20 to 25%, but the cost to inject steam is high. |
| SAGD | Steam Assisted Gravity Drainage uses at least two horizontal wells--one at the bottom of the formation and another about 5 meters above it. Steam is injected into the upper well, the heat reduces the viscosity of the heavy oil, which allows it to drain by gravity into the lower well, where it is pumped to the surface. SAGD is cheaper than CSS, allows very high oil production rates, and recovers up to 60% of the oil in place. |
| FA-SAGD | Foam assisted SAGD. |
| VAPEX | Vapor Extraction Process is similar to SAGD, but instead of steam, hydrocarbon solvents are injected into an upper well to dilute heavy oil and enables the diluted heavy oil to flow into a lower well. |
| ISC | In situ combustion involves a burning of a small amount of the oil in situ, the heat thereby mobilizing the heavy oil. |
| THAI | Toe to Heel Air Injection is an ISC method that combines a vertical air injection well with a horizontal production well. The process ignites oil in the reservoir and creates a vertical wall of fire moving from the "toe" of the horizontal well toward the "heel", which |

TABLE 2-continued

Enhanced Oil Recovery (EOR) Techniques

| | |
|---|---|
| | burns the heavier oil components and upgrades some of the heavy bitumen into lighter oil right in the formation. Fireflood projects are not extensively used due to the difficulty in controlling the flame front and a propensity to set the producing wells on fire. However, the method uses less freshwater, produces 50% less greenhouse gases, and has a smaller footprint than other production techniques. |
| COGD | Combustion Overhead Gravity Drainage is another ISC method that employs a number of vertical air injection wells above a horizontal production well located at the base of the bitumen pay zone. An initial Steam Cycle similar to CSS is used to prepare the bitumen for ignition and mobility. Following that cycle, air is injected into the vertical wells, igniting the upper bitumen and mobilizing (through heating) the lower bitumen to flow into the production well. It is expected that COGD will result in water savings of 80% compared to SAGD. |
| EM | A variety of electromagnetic methods of heating oil in situ are also being developed. |
| RF | Radio Frequency heating of heavy oil/bitumen/heavy oil reservoirs to decrease the viscosity of the oil allowing it to flow. |
| Resistive Heating | Generating heat by resistance methods to heat the heavy oil/bitumen allowing it to flow and be produced. |
| GAS INJECTION | A variety of gas injection methods are also used or being developed, including the use of cryogenic gases. |
| COMBO | Any of the above methods can be used in combination. |

Figure 1A:
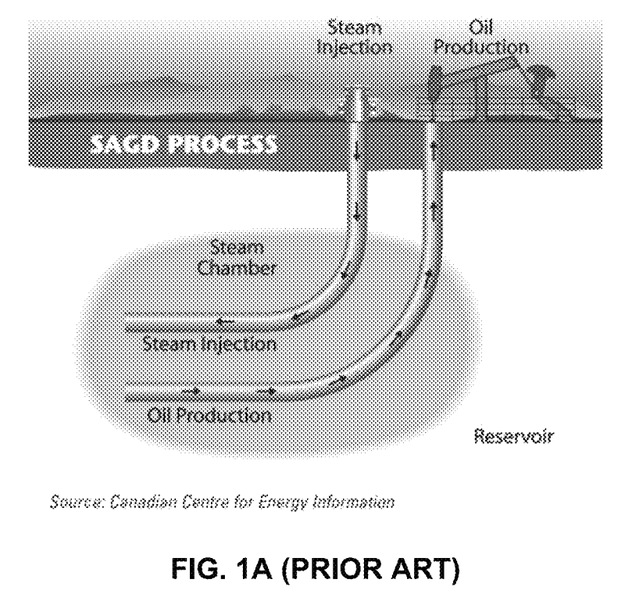
FIG. 1A. Diagram of a typical SAGD process.
Figure 1B:
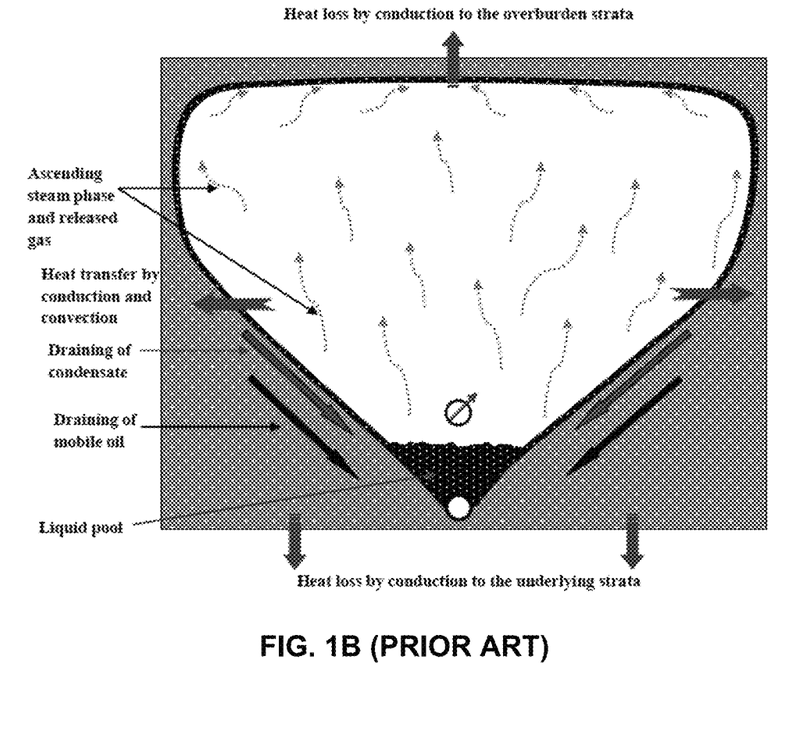
FIG. 1B. Schematic of a steam chamber in the SAGD process.

The Steam Assisted Gravity Drainage (SAGD) process, invented by Butler in the early 80's (e.g., U.S. Pat. No. 4,344,485) has been the most popular thermal recovery process used to date in the production of heavy oil and bitumen. In the SAGD process, at least two horizontal wells are drilled, one over the other, and steam is injected into the upper well (see FIG. 1). The hot steam creates an expanding steam chamber, where the heat is transferred from the condensation of the steam mobilizes the oil, which then gravity drains around the edge of the steam chamber into the lower well along with any condensed water. The heat is transferred, by both conduction and convection, first to the condensate that flows along the edge of the steam chamber, and then the adjacent oil. As the oil is removed and more steam is injected, the boundary of the steam chamber expands upwards and sideways, and new oil is mobilized. The advantage of the SAGD process is its high oil production rate, recovering as much as 60-70% of the oil in place.

However, the high production rate of the SAGD process is also associated with intensive energy consumption and $CO_2$ emissions from burning natural gas to generate steam, as well as costly post-production water purification treatment and separation of the water from the production fluid. Furthermore, the steam-to-oil ratio needed to produce oil is quite high (~3), and high water usage is a deterrent in many locations.

Further contributing to costliness, much of the energy used is wasted in SAGD and other steam-based methods. In fact, some estimate that on average, one third of the energy injected is produced back with fluids, one third is lost to the over-burden and under-burden rock, and one third is left in the depleted portion of the reservoir after abandonment. Therefore, a great deal of research is focused on lowering the cost of energy, while maintaining or increasing the corresponding oil production.

Another source of inefficiencies in steam-based EOR methods is caused by preferential channeling of the steam and/or water directly to the production well. After steam has been injected for some period of time, oil swept areas have increased permeability and these areas of high permeability tend to act as steam thieves. Once swept of oil, the pressure drops between the injector and the producer causing the depleted zones to receive the majority of the injected steam. The less permeable, oil-saturated areas remain virtually untouched by continued steaming.

In an effort to reduce channeling, various foaming surfactants and methods of application have been experimented through laboratory studies. This experimentation has been progressing for more than 20 years and has resulted in an extensive patent literature. See e.g., U.S. Pat. Nos. 3,993,133, 3,994,345, 4,086,964, 4,161,217, 4,488,976, 4,532,993, 4,601,336, U.S. Pat. No. 4,643,256, 4,693,311, 4,702,317, 4,727,938, 5,031,698, 5,052,487, 5,172,763, 5,193,618, all of which are directed in one way or another to control the flow of steam using various foaming agents.

U.S. Pat. No. 4,609,044, in contrast, illustrates that recovery of an acidic reservoir oil is improved by injecting steam accompanied by (a) enough dissolved alkaline monovalent salt to ion-exchange multivalent cations from the reservoir rocks and precipitate those ions in compounds which are insoluble in an alkaline aqueous liquid as well as forming soaps of the reservoir oil acids and (b) surfactants for foaming the steam and increasing the salt tolerance of an aqueous surfactant system containing the soaps of the reservoir oil acids.

U.S. Pat. No. 5,207,271 is directed to steam foam fracturing.

Even though all of the above discuss using a foaming agent with steam, none of these discuss the possibility of using a foaming agent together with a low quality steam or hot water to optimize the steam based recovery methods by scavenging any heat that is lost during the process.

Thus, what is needed in the thermal recovery processes are improved methods of producing heavy oils, preferably methods which reduce steam and therefore, energy requirements.

SUMMARY OF THE DISCLOSURE

The invention can includes any one or more of the following embodiments or combinations thereof:

A method of producing oils is provided, comprising the steps of:

a) providing an injection well and a production well in fluid communication with said injection well;

b) injecting steam into said injection well for a period of time;

c) collecting a hydrocarbon from said production well with a first steam-to-oil ratio (SOR);

d) subsequently injecting low quality steam and a foaming agent and an optional gas into said injection well for a second period of time, when a second SOR exceeds said first SOR; and e) collecting a hydrocarbon from said production well.

Preferably, the cumulative SOR of all oil produced is lower than would be produced without said foam heat scavenging step d for a same total injection period of time. Also preferred, more oil is produced with foam heat scavenging injection step d, than with said method omitting step d for a same total injection period of time. Further, the method can also be used with any hydrocarbons, including conventional oils, although it is particulary useful for heavier oils.

The foaming agent can be any foaming agent that is stable under reservoir conditions, and functions as a heat scavenger including, but not limited to thermally and chemically stable non-ionic, anionic, cationic, amphoteric or zwitterionic surfactants. Specifically, alpha olefin sulfonates (AOS) and internal olefin sulfonates (IOS) with higher carbon chain length (e.g., at least C14), alkyl aryl or alkyl aromatic sulfonates such as alkyl benzene sulfonates, alkyl xylene sulfonates and alkyl toluene sulfonates, alkoxy and alcohol propoxy sulfates and petroleum sulfonates. Suitable chemical agents could also include alkaline metal carbonates, alkaline metal bicarbonates and alkaline metal hydroxides including, but not limited to sodium carbonate, sodium bicarbonate, sodium hydroxide, potassium carbonate, potassium bicarbonate, potassium hydroxide, magnesium carbonate and calcium carbonate. Other agents that can be used are any other colloidal foams, aerosols, hydrosols, emulsions or dispersions which could create a suitable and stable foam. The suitable foam may be a blend including at least one of the above mentioned surfactant categories as the primary surfactant along with a co-surfactant, a co-solvent and/or an above mentioned alkali. Co-solvents may include various alcohols such as propanol, butanol, pentanol and similar linear or branched alcohols. A betaine such as cocamidopropyl-betaine, lauryl-betaine and the like could also be used to stabilize foam in the presence of oil.

The gas can be any suitable, cost effective and readily available gas, including air, oxygen, hydrogen, nitrogen, methane, carbon dioxide, carbon monoxide, hydrogen sulfide, propane, butane, natural gas, flue gas, or natural gas liquids containing propane, butane, or hexane.

An improved method of steam assisted gravity drainage (SAGD) production of oil is provided, comprising injecting steam into a horizontal injection well and recovering produced hydrocarbons from a lower horizontal production well, the improvement comprising injecting steam into said injection well until oil production begins to decrease, and then injecting lower quality steam plus a foaming agent plus an optional gas to scavenge heat from a depleted steam chamber and generate steam in situ.

An improved method of steam based enhanced oil recovery is provided, comprising injecting steam and solvent into an injection well and recovering produced hydrocarbons from a production well, the improvement comprising injecting steam into said injection well until an SOR begins to increase past an economic limit of production, and then injecting lower quality steam plus a foaming agent plus an optional gas to scavenge heat from a depleted steam chamber and generate steam in situ, thus reducing the overall cumulative SOR.

A method of producing oil by SAGD is provided, said method comprising the steps of providing in an oil formation a horizontal injection well and a horizontal production well beneath said horizontal injection well, wherein said injection well and said production well are in fluid communication with each other; injecting steam into said injection well for a first period of time; collecting a production fluid from said production well until an SOR exceeds the economic limit; subsequently injecting steam and a foaming agent and an optional gas into said injection well for a second period of time; collecting additional production fluid from said production well; wherein the overall average SOR is reduced as compared with the same method omitting the foam heat scavenging step if continued for a same total period of time.

Another improved method of producing oil by a thermal recovery process is provided, wherein the improvement comprises collecting a production fluid from a production well until an SOR exceeds the economic limit; subsequently injecting steam and a foaming agent and an optional gas into said injection well for a second period of time; and collecting additional production fluid from said production well; wherein the thermal recovery process is CSS, VAPEX, ES-SAGD, SAGD, ISC, COGD, RF or any combination thereof.

DETAILED DESCRIPTION

The disclosure relates to a heat scavenging method using an agent for forming foams/aerosols/hydrosols/other emulsions or colloidal dispersions, which can be abbreviated FHS for foam heat scavenging, herein. In some embodiments, the foams/aerosols/hydrosols/other emulsions or colloidal dispersions form above ground and injected instead of forming in situ.

This FHS invention will prolong the working life of the thermal recovery methods and increase oil production by allowing the use of low quality steam or hot water, a composition (such as a foaming agent, used hereafter for exemplary purposes only given possibility of creating the aerosols/hydrosols/other emulsions or dispersions) for the FHS, and optionally a gas to generate a foam that can capture the residual heat stored in the depleted portion of the reservoir to create in situ steam that will then be used to further recover bitumen.

The process will reduce the amount of energy left behind in the reservoir by utilizing the otherwise wasted energy to produce in-situ steam and thereby reducing the amount of steam that needs to be generated at the surface facilities. This will reduce the cost of production and extend the economic limit and allow heavy oil recovery to increase.

In the prior art methods, steam is injected into the reservoir at high pressure and temperature, but as the steam condenses on the cold bitumen, it turns to water that occupies a significantly lower volume than the steam occupied. This creates a lower pressure zone. The injected steam flows from the high pressure injection well to the low pressure zone adjacent the bitumen.

Also during the prior art processes, as the bitumen is produced, a depleted volume is left in the reservoir rock that is primarily filled with steam from the injector. As steam enters this bitumen-depleted zone, the reservoir rock absorbs much of the energy from the steam over time, and the steam may not reach the edges of the chamber where a fresh oil face is found. The energy absorbed into the rock/sand is essentially wasted energy because it is not recovered or used to further produce bitumen. This wasted energy leads to inefficiencies in the process.

This disclosure provides a method for capturing the waste heat that was absorbed onto the reservoir rock and/or sand in the depleted steam chamber to create steam in-situ, thereby reducing the amount of steam that needs to be generated in the surface process facilities and furthering the economic limit of heavy oil production.

This will be accomplished by injecting low quality steam and/or hot water, a composition for the FHS, and an optional gas into the reservoir with a sufficiently large hot depleted volume and before going into full blowdown, at which point the SAGD process would normally be terminated.

Low quality steam is a mixture of steam and hot water that is generated when not all of the water is converted to steam in the steam generator. Typically, this water is removed by traps in the piping before the steam is injected. However, in the proposed method, this low quality steam is intentionally injected (e.g., the water traps are disabled or bypassed) together with the foaming agent and optional gas.

The mechanism involved in this invention will be the formation of foam by means of a surfactant or other chemical agent, steam and water, and perhaps gas, which functions to carry the water deeper into the reservoir towards the hot rock allowing the water to absorb heat and create steam in situ. The creation of foam is important for the process to be successful. Without the foam, the water in the low quality steam would cool the area around the injector and would flow directly to the production well.

Instead, the foam carries the steam and water from the high pressure injector towards the lower pressure zone and hotter rock at the edge of the chamber. The foam carries the water via buoyancy forces until it comes in contact with rock that is at a temperature sufficient to vaporize the water into steam, thereby, creating additional steam in-situ. The in-situ generated steam together with the surface generated steam would then travel throughout the depleted zone to the steam/oil interface where it can transfer heat to the heavy oil and condense steam, thereby continuing SAGD or other steam-based process and producing more oil.

The foam thus provides the mechanism to carry water from the low quality steam/hot water deeper into the reservoir, where it can be converted to steam instead of condensing and flowing directly to the producer.

For the generation of foam and for the foam to be sustained, a gas may be used along with the steam. Foams based on steam alone may collapse if the steam inside the foam condenses. The outer layer of the foam would contain the surfactant and water. Steam or heat is still required so that the reservoir is not cooled down to the point where the energy in the rock is absorbed by the gas, however, the overall steam usage would be lower as compared to a standard SAGD process. Furthermore, the overall SOR would also be reduced slightly.

Gases that can be co-injected with the steam and surfactant include, but are not limited to air, oxygen, hydrogen, nitrogen, methane, carbon dioxide, carbon monoxide, hydrogen sulfide, propane, butane, natural gas, and flue gas. Gases may come in the form of a gas/liquid mixture; including natural gas liquids containing propane, butane, pentane, and hexane.

The use of non-condensable gases can also allow the increase of pressure drive mechanisms, and may also create a gas blanket near the top of the reservoir, thus further improving recoveries, as in SAGP methods.

Foaming agents include thermally and chemically stable, non-ionic, anionic, cationic and amphoteric/zwitterionic surfactants, including, but not limited to, alkyl benzene sulfonates, aromatic sulfonates, olefin sulfonates, alkyl aryl sulfonates and alkoxy sulfates. Alkaline metal carbonates, bicarbonates and hydroxides can also be used, including, but not limited to sodium carbonate, sodium bicarbonate, sodium hydroxide, potassium carbonate, potassium bicarbonate, potassium hydroxide, magnesium carbonate and calcium carbonate. The surfactant and/or alkaline metal carbonate concentration should be optimized for the particular rock/oil/brine system in the reservoir.

The desired properties of the generated foam are densities in the range of 0.000598-0.0770 g/cm3 and viscosities in the range of 0.0123-0.0216 cP.

It may also be possible to combine the method with hybrid steam-solvent based EOR methods. However, the solvent and foaming agent would have to be chosen so as to be compatible at the solvent concentrations used.

The proposed method could transport the injected low quality steam or solvent to parts of the steam chamber where needed. ES-SAGD process could be used as a post SAGD process where there is about two thirds of energy remained in the depleted portion of the reservoir and in overburden rock due to heat losses during the SAGD process. Foams/colloidal dispersions could be used along with low quality steam to carry the selected solvent(s) into the steam chamber where the heat of the chamber could be used to vaporize the solvent, thereby initiating the ES-SAGD process. The ES-SAGD process could also be used after several years of SAGD operation at which time the SAGD steam chamber had reached the top of the continuous bitumen pay and will begin to have higher energy losses to the overburden rock. So, steam-solvent injection could begin after the steam chamber had reached the top of continuous bitumen pay and/or before the steam chambers from the adjacent wells have not yet coalesced. Foams/colloidal dispersions could be used to carry solvent(s) further into the reservoir when steam-solvent injection commences. Foams/colloidal dispersions could also be used to carry water further into the reservoir, where it could generate in-situ steam by using the heat that has already been left behind after steam injection.

The selected foam should have a higher affinity to the solvents selected for the ES-SAGD process. The surfactants used to create foam for hybrid steam-solvent processes may defer to that of steam only based methods. Hydrocarbon based or oil soluble surfactants may be ideal to be used with solvent injection as long as the foams created with these surfactants are low density and low viscosity foams. Oil soluble surfactants which could be used to create foams include, but are not limited to, sorbitan fatty acid esters, saponified hard oils, saponified hydrogenated fatty acid oils, long chain fatty amines, long chain sulfates, long chain sulfonates, phospholipids, lignins, poly ethylene glycol mono-oleates, alkanolamide based surfactants, any other oil soluble surfactants and any combinations thereof.

The foam can be generated on the surface or sub-surface. Sub-surface methods for generating foam include using a static mixer downhole, foam generation through a perforation in the well, natural mixing in the well, and in-situ foam generation in the reservoir.

Foam could be injected continuously with low quality steam or could be injected in slugs with or without a gas, but continuous co-injection may be more efficacious. Foam could be injected from the beginning of the SAGD or other steam based process, but preferably commences after injection of steam for a period of time at which time the SOR begins to increase.

The advantage of this process is that it reduces the amount of steam that has to be generated in the surface facilities by using the waste heat in the rock to generate steam. This in return, reduces the cost of fuel gas, reduces the cost of water treatment and reduces the green-house gas emissions per barrel of bitumen produced. Steam is more efficient at transferring energy to the heavy oil/bitumen by condensation. Using surfactants and/or other foaming agents allows for the formation of foam, which in turn allows for a mechanism to carry water further into the reservoir to absorb more energy. Without foam, the water in the low quality steam will cool the area around the injector, which will cause for most of the water to accumulate near the well and channel to the producer. With the foam, injected water can be continuously carried further into the reservoir to absorb energy and create in-situ steam.

As used herein, "bitumen" and "extra heavy oil" are used interchangeably, and refer to crudes having less than 10° API.

As used herein, "heavy oil" refers to crudes having less than 22° API.

As used herein a "production stream" or "production fluid" or "produced heavy oil" or similar phrase means a crude hydrocarbon that has just been pumped from a reservoir and typically contains mainly heavy oil and/or bitumen and water, and may also contain additives such as solvents, foaming agents, and the like.

By "fluid" herein, we mean liquid, gas or a combination thereof.

By "steam", we mean a hot water vapor, at least as provided to an injection well, although some steam will of course condense as the steam exits the injection well and encounters cooler rock, sand or oil. It will be understood by those skilled in the art that steam usually contains additional trace elements, gases other than water vapor, and/or other impurities. The temperature of steam can be in the range of about 150° C. to about 350° C. However, as will be appreciated by those skilled in the art, the temperature of the steam is dependent on the operating pressure, which may range from about 100 psi to about 2,000 psi (about 690 kPa to about 13.8 MPa).

By "low quality steam", we mean a combination of liquid water and water vapor provided to the injection well. In some embodiments, such wet steam is 50 wt. %, 60 wt. % or more liquid water.

By "solvent", we mean an organic fluid that can dilute heavy oil and/or bitumen. Examples of suitable candidates for non-aqueous fluids that may satisfy the selection criteria include, without limitation, C1 to C10 hydrocarbons, and combinations thereof. Examples of suitable C1 to C10 solvents include, without limitation, gases, such as $CO_2$, CO, and the like, alkanes such as methane, ethane, propane, butane, pentane, hexane, heptane, octane, nonane, decane, as well as various available hydrocarbon fractions, such as condensate, gasoline, light naptha and combinations thereof.

It is recognized by those of skill in the art that most solvents are not inexpensively available in 100% pure form and that pure solvents are not needed for EOR methods anyway. Therefore, where it is stated herein that a solvent is a C4 solvent (for example) what is meant is that the majority (>50%) of that solvent has four carbons, and that the remainder may comprise solvents within a similar boiling point range.

In the case of either the single or multiple wellbore embodiments of the invention, if fluid communication is not already established, it must be established at some point in time between the producing wellbore and a region of the subterranean formation containing the hydrocarbon fluids affected by the injected fluid, such that heavy oils can be collected from the producing wells.

By "fluid communication" we mean that the mobility of either an injection fluid or hydrocarbon fluids in the subterranean formation, having some effective permeability, is sufficiently high so that such fluids can be produced at the producing wellbore under some predetermined operating pressure. Means for establishing fluid communication between injection and production wells includes any known in the art, including steam circulation, geomechanically altering the reservoir, RF or electrical heating, ISC, solvent injection, hybrid combination processes and the like.

By "providing" wellbores herein, we do not imply contemporaneous drilling. Therefore, either new wells can be drilled or existing wells can be used as is, or retrofitted as needed for the method.

Injection wells can be the same as production wells, or separate wells can be provided for these purposes.

By "increased hydrocarbon mobility", we mean that the hydrocarbon has decreased viscosity and/or reduced interfacial tension, as compared with a hydrocarbon produced using only steam under substantially similar injection and formation conditions.

Similarly, when we say that the method results in "improved" or "increased" heavy oil production or similar phrase, we mean that more oil is produced using the claimed steam-plus-foam heat capture method than could be produced by use of steam alone, for a similar total injection period in the same reservoir at the same conditions.

In one embodiment of the invention, steam and foam may be co-injected. In another embodiment of the invention, steam injection may be alternated with steam and foam co-injection. In other embodiments, the foam is generated on the surface, and in another it is generated in situ.

Figure 2:
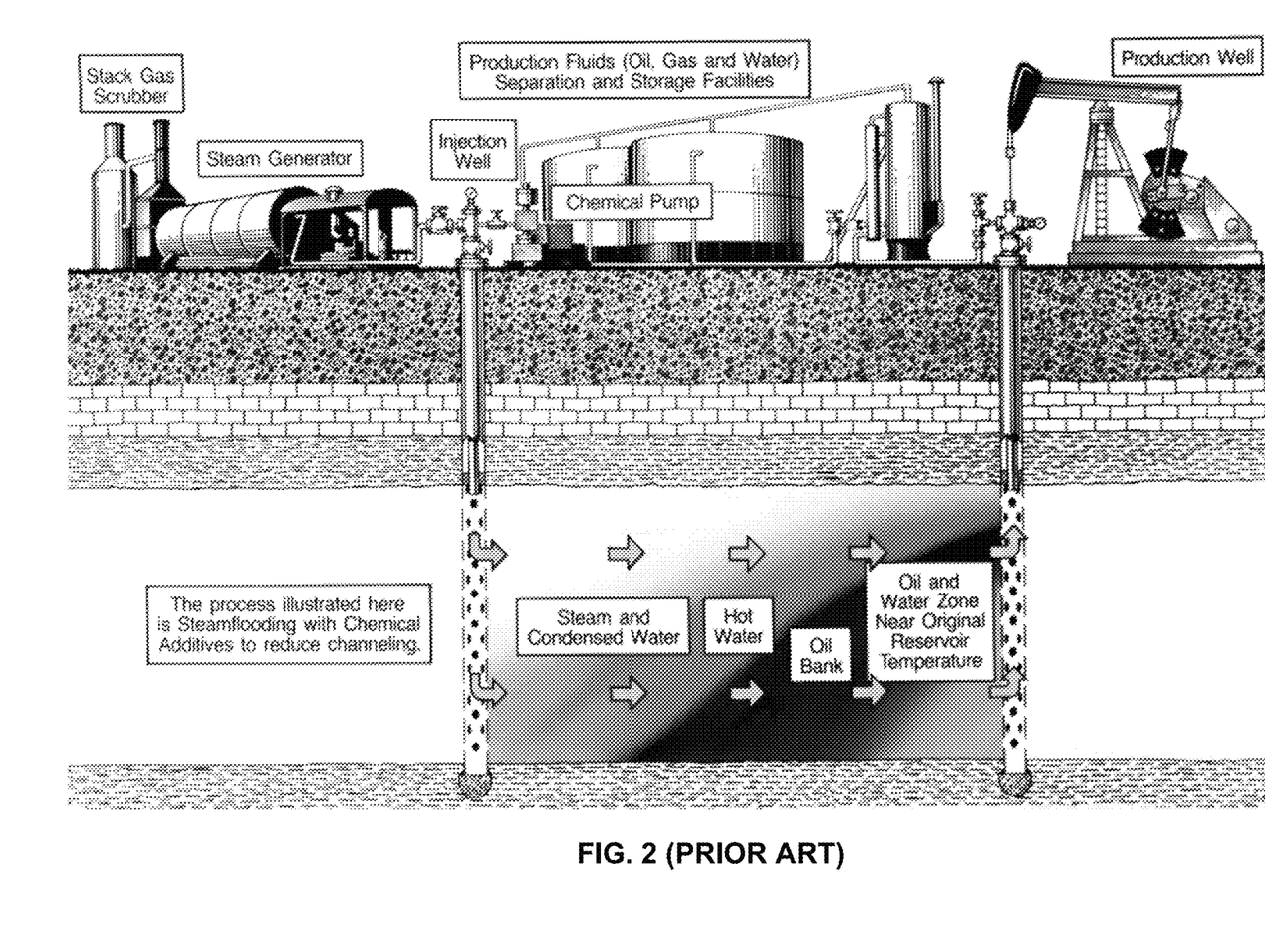
FIG. 2. A vertical well steam production method.
Figure 3A:
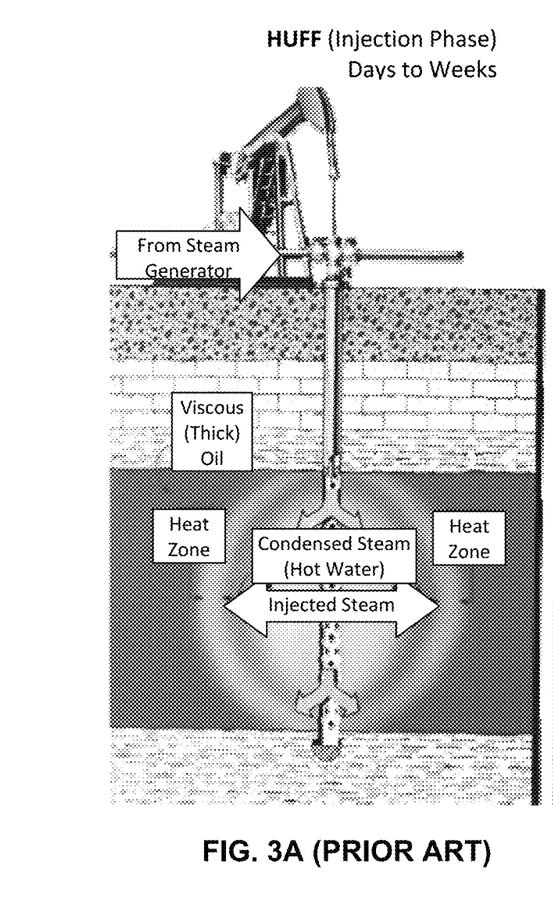
FIG. 3A. Cyclic steam stimulation aka "Huff and Puff" showing injection phase.
Figure 3B:
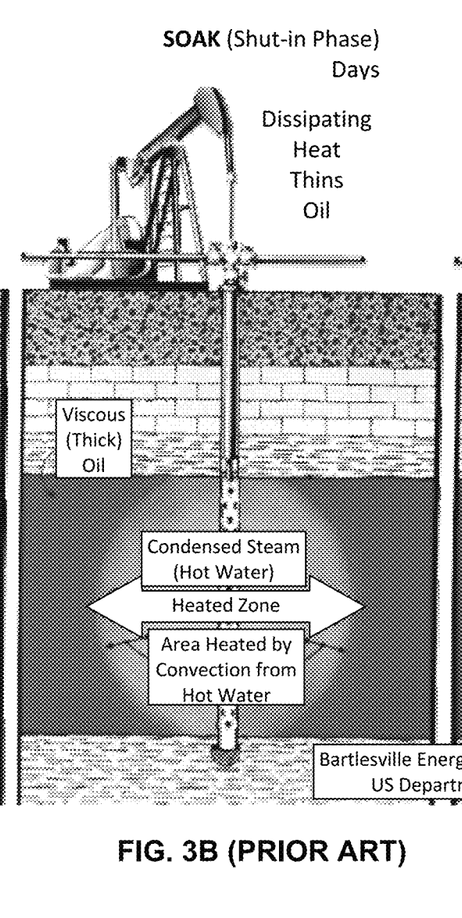
FIG. 3B. Cyclic steam stimulation aka "Huff and Puff" showing soak phase.
Figure 3C:
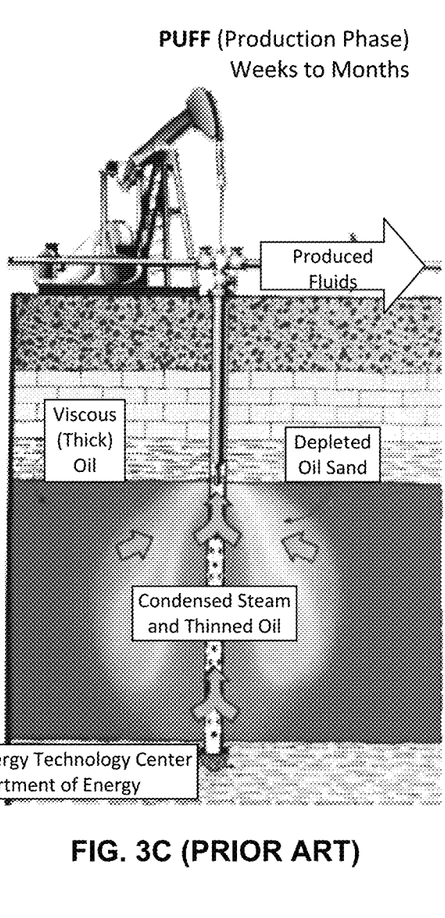
FIG. 3C. Cyclic steam stimulation aka "Huff and Puff" showing production phase.

The method is most preferably combined with SAGD and other gravity drainage methods, however, it is not limited to such methods and the method can be used in any known or invented steam-based enhanced oil production methods. Thus, the method can be used with toe to heel steam production methods, steam flooding techniques using vertical wells (see FIG. 2), cyclic steam stimulation (CSS, see FIG. 3), steam and gas push (SAGP), steam flooding, and the like, as well as in any of the hybrid methodologies, such as expanding solvent—SAGD (ES-SAGD), solvent aided process (SAP), and the like. Furthermore, the method can be used after any of the existing EOR methods. Thus, for example, an injection/production well pair can be initiated with CSS or with in situ combustion (ISC), and the steam-foam heat capture method can follow thereafter.

In particular, the method can be implemented when the steam-to-oil ratio or "SOR" increases beyond the economic limit of recovery which may vary based on other factors. The economic limit will vary based on current prices, conditions, and the like, but is expected to range from 3 to 5 or thereabouts.

For reservoirs with poor vertical communication due to the presence of shale or other low permeability layers, the method can be combined with hydraulic fracturing, especially vertical hydraulic fractures, to accelerate steam chamber growth and consequently oil production in the FHS process.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", and "include" (and their variants) are open-ended linking verbs and allow the addition of other elements when used in a claim.

The phrase "consisting of" is closed, and excludes all additional elements.

The phrase "consisting essentially" of excludes additional material elements, but allows the inclusions of non-material elements that do not substantially change the nature of the invention.

The following abbreviations are used herein:

| ABBREVIATION | TERM |
| --- | --- |
| API | American Petroleum Institute |
| API gravity | To derive the API gravity from the density, the density is first measured using either the hydrometer, detailed in ASTM D1298 or with the oscillating U-tube method detailed in ASTM D4052. Direct measurement is detailed in ASTM D287. |
| bbl | barrel |
| COGD | Combustion Overhead Gravity Drainage |
| Cp | Centipoise |
| CSS | Cyclic Steam Stimulation |
| cSt | Centistokes. Kinematic viscosity is expressed in centistokes |
| EM | electromagnetic |
| EOR | Enhanced oil recovery |
| ES-SAGD | Expanding solvent SAGD |
| FA | Foam assisted |
| FA-SAGD | Foam assisted SAGD |
| FHS | Foam Heat Scavenging |
| ISC | In situ combustion |
| OOIP | Original oil In place |
| RF | Radio frequency |
| SAGD | Steam Assisted Gravity Drainage |
| SAGP | Steam and gas push |
| SAP | Solvent aided process |
| SF | Steam flooding |
| SF-SAGD | Steam flood SAGD |
| SOR | Steam-to-oil ratio |
| THAI | Toe to heal air injection |
| VAPEX | Vapor assisted extraction process |

The method differs to that of other steam-foam methods due to the different goal we achieve with the method (i.e. heat scavenging), and thus necessarily different mechanism of action. Because of this, the optimal type of foam/chemical agent differs from prior art foaming agents.

We are proposing a low density, low viscosity foam/emulsion/dispersion, which could efficiently carry water into overburden rock in a formation. Other methods require a viscous dense foam that will be stable under reservoir conditions, so that they can be used to divert flow. While not limited to any particular theory, the foams that others have suggested will not effectively carry water to overburden rock since they will have relatively higher density and viscosity.

The chosen foaming agent to improve the efficiency of a thermal recovery process such as Steam-Assisted Gravity Drainage (SAGD) should have the following characteristics: thermal and chemical stability at high temperatures; low density and low viscosity of the generated foam; chemical stability at salinities/divalent cations of the particular formation brine; low adsorption onto rock/clay surfaces of the particular reservoir; low or no reactivity/precipitation with the particular reservoir rock minerals; degradability with time to avoid production of emulsions; effectiveness at the particular reservoir brine pH; availability and lower costs of chemicals.

The following references are incorporated by reference in their entirety for all purposes.

Al-Khafaji, Ali Habib, Wang, Pin-Ton Fred, Castanier, Louis M. and Brigham, William E., "Steam Surfactant Systems at Reservoir Conditions", paper SPE 10777 presented at the California Regional Meeting of the Society of Petroleum Engineers, San Francisco, Calif., Mar. 24-26, 1982.

Bagci, S., Dogay, S., Pamukcu, Y. and Yilmaz, Y., "Investigation of Surfactant-SAGD Process in Fractured Carbonate Reservoirs", paper 2004-087 presented at the Petroleum Society's 5th Canadian International Petroleum Conference (55th Annual Technical Meeting), Calgary, Alberta, Canada, Jun. 8-10, 2004.

Brigham, W. E., Marcou, J. A., Sanyal, S. K., Malito, O. P., Castanler, L. M., "A Field Experiment of Improved Steamdrive with In-Situ Foaming", SPE Production Engineering, August 1989.

Chen, Q., Gerritsen, M. G. and Kovscek, A. R., "Improving Steam-Assisted Gravity Drainage Using Mobility Control Foams: Foam Assisted-SAGD (FA-SAGD)", paper SPE 129847 presented at the SPE Improved Oil Recovery Symposium, Tulsa, Okla. USA, Apr. 24-28, 2010.

Chiang, Jin C., Sawyal, Subir K., Castanier, Louis M., Brigham, William E. and Sufi, Arshad, "Foam as a Mobility Control Agent in Steam Injection Processes", paper SPE 8912 presented at the 50th Annual California Regional Meeting of the Society of Petroleum Engineers of AIME, Los Angeles, Calif., Apr. 9-11, 1980.

Cooke, R. W. and Eson, R. L., "Field Results of Optimizing the Steam Foam Diversion Process in Cyclic Steam Applications", paper SPE 21531 presented at the International Thermal Operations Symposium, Bakersfield, Calif., Feb. 7-8, 1991.

Delamaide, E. and Kalaydjian, F., "A Technical and Economical Evaluation of Steam Foam Injection Based on a Critical Analysis of Field Applications", paper SPE 35692 presented at the Western Regional Meeting, Anchorage, Ak., May 22-24, 1996.

Demiral, M. R. B. and Okandan, E., "Experimental Analysis of Steam Foam Injection to Heavy Oil Limestone Reservoirs", paper SPE 15734 presented at the 5th SPE Middle East Oil Show, Manama, Bahrain, Mar. 7-10, 1987.

Dilgren, Richard E., Deemer, Arthur R. and Owens, Kenneth B., "The Laboratory Development and Field Testing of Steam/Noncondensible Gas Foams for Mobility Control in Heavy Oil Recovery", paper SPE 10774 presented at the California Regional Meeting of the Society of Petroleum Engineers, San Francisco, Calif., Mar. 24-26, 1982.

Djabbarah, N. F., Weber, S. L., Freeman, D. C., Muscatello, J. A., Ashbaugh, J. P. and Covington, T. E., "Laboratory Design and Field Demonstration of Steam Diversion with Foam", paper SPE 20067 presented at the 60th California Regional Meeting, Ventura, Calif. Apr. 4-6, 1990.

Eson, R. L. and O'Nesky, S. K., "The Application of In-Situ Steam Foams to Improve Recovery in Mature Steam Drives", paper SPE 11704 presented at the California Regional Meeting of the Society of Petroleum Engineers, Ventura, Calif., Mar. 23-25, 1983.

Eson, R. L. and Cooke, R. W., "A Successful High-Temperature Gel System to Reduce Steam Channeling", paper SPE 24665 presented at the 67th Annual Technical Conference and Exhibition of the Society of Petroleum Engineers, Washington, D.C., Oct. 4-7, 1992.

Falls, Andrew H., Lawson, Jimmie B. and Hirasaki, George J., "The Role of Noncondensable Gas in Steam Foams", Journal of Petroleum Technology, January 1988.

French, T. R., Broz, J. S., Lorenz, P. B. and Bertus, K. M., "Use of Emulsions for Mobility Control During Steamflooding", paper SPE 15052 presented at the 56th California Regional Meeting of the Society of Petroleum Engineers, Oakland, Calif., Apr. 2-4, 1986.

Green, Kirk, Isaacs, Eddy and Chhom, Kiry Non, "Laboratory Study of the Use of Foam in Cyclic Steam Injection", The Journal of Canadian Petroleum Technology, 1991.

Isaacs, E. Eddy, McCarthy, F. Clare and Maunder, J. Darol, "Investigation of Foam Stability in Porous Media at Elevated Temperatures", SPE Reservoir Engineering, May 1988.

Isaacs, E. E., Green, M. K., Jossy, W. E. and Maunder, J. D., "Conformance Improvement by Using High Temperature Foams and Gels", paper SPE 23754 presented at the 2nd Latin American Petroleum Engineering Conference of the Society of Petroleum Engineers, Caracas, Venezuela, Mar. 8-11, 1992.

Julio, S. S. Dl and Emanuel, A. S., "Laboratory Study of Foaming Surfactant for CO2 Mobility Control", SPE Reservoir Engineering, May 1989.

Juprasert, Max S. and Davis, Bruce W., "Stimulation by Defoaming Increases Thermal Oil Production", paper SPE 35695 presented at the Western Regional Meeting, Anchorage, Ak., May 22-24, 1996.

Kulakofsky, D., Armstrong, K., Szymanski, M. and Raabe, G., "New Ultra-Lightweight Ultra-High Temperature Slurry Design Provided the Required Resilience for Steam Injection Work in Kuwait", paper SPE 97682 presented at the SPE International Improved Oil Recovery Conference in Asia Pacific, Kuala Lumpur, Malaysia, Dec. 5-6, 2005.

Law, David H. S., "An Optimization Study for a Steam-Foam Drive Process in the Bodo Reservoir, Alberta, Canada", paper no 17 presented at the 3rd Technical Meeting of the South Saskatchewan Section, the Petroleum Society of CIM, Regina, Sep. 25-27, 1989.

Law, D. H. S. and Ridley, R., "Simulation of a Three-Dimensional Steam Drive with Surfactant and Nitrogen", paper no. CIM 92-58 presented at the CIM Annual Technical Conference, Calgary, Jun. 7-10, 1992.

Law, David H. S., "An Optimization Study for a Steam-Foam Drive Process in the Bodo Reservoir, Alberta", The Journal of Canadian Petroleum Technology, 1992.

Law, D. H. S., Ridley, R. and Kimber, K. D., "Steam-Foam Drive Experiments in One-Eighth of a Five-Spot Pattern", paper no. 2 presented at the 5th Petroleum Conference of the South Saskatchewan Section, The Petroleum Society of CIM, Regina, Canada, Oct. 18-20, 1993.

Maini, B. B., "Laboratory Evaluation of Foaming Agents for High Temperature Applications—II. Measurements of Thermal Stability and Foam Mobility in Porous Media", paper 85-36-30 presented at the 36th Annual Technical Meeting of the Petroleum Society of CIM, Edmonton, Alberta, Canada, Jun. 2-5, 1985.

Maini, Brij B. and Ma, Vincent, "Laboratory Evaluation of Foaming Agents for High-Temperature Applications—I. Measurements of Foam Stability at Elevated Temperatures and Pressures", Well Completions and Operations, Journal of Canadian Petroleum Technology, 1986.

Mendez, Zuleyka, Alvarez, J. M., Escobar, Elena, Colonomos, Peter and Campos, Enrique, "Cyclic Steam Injection with Additives: Laboratory and Field Test Results of Steam/Foam and Steam/Solvent Processes", paper SPE 24632 presented at the 67th Annual Technical Conference and Exhibition of the Society of Petroleum Engineers, Washington, D.C., Oct. 4-7, 1992.

Mohammadi, S. S., Van Slyke, D. C. and Ganong, B. L., "Steam-Foam Pilot Project in Dome-Tumbador, Midway-Sunset Field", SPE Reservoir Engineering, February 1989.

Muijs, H. M., Keijzer, P. P. M. and Wiersma, R. J., "Surfactants for Mobility Control in High-Temperature Steam-Foam Applications", paper SPE/DOE 17361 presented at the SPE/DOE Enhanced Oil Recovery Symposium, Tulsa, Okla., Apr. 17-20, 1988.

Patzek, Tad W., "Field Applications of Steam Foam for Mobility Improvement and Profile Control", SPE Reservoir Engineering, May 1996.

Ploeg, J. F. and Duerksen, J. H., "Two Successful Steam/Foam Field Tests, Sections 15A and 26C, Midway-Sunset Field", paper SPE 13609 presented at the California Regional Meeting of the Society of Petroleum Engineers, Bakersfield, Calif., Mar. 27-29, 1985.

Robaina, R. M., Maraven, S. A. and Ziritt, J. L., "Evaluation of a Surfactant: Steam-Soak Pilot Test in the Bolivar", paper SPE/DOE 17386 presented at the SPE/DOE Enhanced Oil Recovery Symposium, Tulsa, Okla. Apr. 17-20, 1988.

Zlegler, V. M., "Laboratory Investigation of High-Temperature Surfactant Flooding", SPE Reservoir Engineering, May 1988.

U.S. Pat. Nos. 3,994,345; 3,993,133; 4,086,964; 4,161,217; 4,488,976; 4,532,993; 4,609,044; 4,601,336; 4,693,311; 4,643,256; 4,609,044; 4,702,317; 4,727,938; 5,031,698; 5,172,763; 5,193,618; 5,207,271; 5,052,487; US20100258265;
SPE129847-MS

What is claimed is:

1. A method of producing heavy oil, comprising:
providing a horizontal injection well in a reservoir over a horizontal production well in said reservoir and in fluid communication with said injection well;
injecting a composition into said injection well, said composition comprising a low density foam for heat scavenging (FHS) and for carrying water via buoyancy forces, wherein said FHS comprises methane gas, steam, an alcohol co-solvent, and a foaming agent, wherein the FHS has a density between 0.000598-0.0770 g/cm$^3$ at reservoir conditions;
producing steam in situ from said FHS to transfer heat from said reservoir to the heavy oil; and
collecting a heavy oil from said production well.

2. The method of claim 1, wherein the foaming agent is a thermally and chemically stable surfactant at reservoir conditions.

3. The method of claim 1, wherein the foaming agent is a non-ionic, anionic, cationic, amphoteric or zwitterionic surfactant.

4. The method of claim 1, wherein the foaming agent is an alkaline metal carbonate or an alkaline metal hydroxide.

5. The method of claim 1, wherein the foaming agent is selected from the group consisting of aromatic sulfonates, alkyl benzyl sulfonates, olefin sulfonates, alkyl aryl sulfonates, alkoxy sulfates, alkaline metal carbonates, alkaline metal bicarbonates, alkaline metal hydroxides, sodium carbonate, sodium bicarbonate, sodium hydroxide, potassium carbonate, potassium bicarbonate, potassium hydroxide, magnesium carbonate and calcium carbonate.

6. The method of claim 1, wherein said methane gas further comprises air, oxygen, hydrogen, nitrogen, carbon dioxide, carbon monoxide, hydrogen sulfide, propane, butane, natural gas, flue gas, or natural gas liquids containing propane, butane, or hexane.

7. An improved method of steam assisted gravity drainage (SAGD) production of oil, comprising injecting steam into a horizontal injection well and recovering produced hydrocarbons from a lower horizontal production well, the improvement comprising injecting steam into said injection well until a steam to oil ratio (SOR) begins to increase past an economic limit of production, and then injecting a low density, said foam comprising lower quality steam, an alcohol co-solvent, a foaming agent, plus a gas comprising methane, said foam having a density between 0.000598-0.0770 $g/cm^3$ at reservoir conditions, wherein said method reduces an overall cumulative SOR as compared to steam injection alone.

8. The method of claim 7, wherein said gas further comprises air, oxygen, hydrogen, nitrogen, carbon dioxide, carbon monoxide, hydrogen sulfide, propane, butane, natural gas, flue gas, or natural gas liquids containing propane, butane, or hexane.

* * * * *